(12) United States Patent
Heck et al.

(10) Patent No.: US 8,016,091 B2
(45) Date of Patent: Sep. 13, 2011

(54) SOLID STOP LEAF SPRING

(75) Inventors: Thomas Heck, Wooster, OH (US); Jonathan G. Jameson, Canton, OH (US); Brian Zaugg, Millersburg, OH (US); Patrick Lindemann, Wooster, OH (US); David C. Avins, Burbank, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1190 days.

(21) Appl. No.: 11/897,403

(22) Filed: Aug. 30, 2007

(65) Prior Publication Data
US 2008/0190723 A1   Aug. 14, 2008

Related U.S. Application Data

(60) Provisional application No. 60/842,487, filed on Sep. 6, 2006.

(51) Int. Cl.
*F16H 45/02* (2006.01)
*F16D 3/64* (2006.01)

(52) U.S. Cl. ............... 192/3.29; 192/70.18; 192/109 R; 192/200

(58) Field of Classification Search .............. 192/200; 92/26
See application file for complete search history.

(56) References Cited

U.S. PATENT DOCUMENTS

| | | | | |
|---|---|---|---|---|
| 3,489,256 A | * | 1/1970 | Binder et al. | 192/70.18 |
| 4,353,444 A | * | 10/1982 | Bionaz | 192/3.29 |
| 4,531,622 A | * | 7/1985 | Bacher et al. | 192/70.18 |
| 4,577,740 A | * | 3/1986 | Carmillet | 192/70.18 |
| 4,690,259 A | * | 9/1987 | Naudin | 192/109 R |
| 4,817,775 A | * | 4/1989 | Baccalaro et al. | 192/89.24 |
| 4,867,641 A | | 9/1989 | Okuno et al. | |
| 5,388,678 A | | 2/1995 | Murata | |
| 6,079,530 A | * | 6/2000 | Arhab | 192/3.29 |
| 6,953,112 B2 | | 10/2005 | Miura | |
| 7,040,469 B2 | | 5/2006 | Shirataki et al. | |
| 2004/0112699 A1 | | 6/2004 | Prater et al. | |
| 2005/0039998 A1 | * | 2/2005 | Zuehl et al. | 192/3.29 |
| 2006/0201765 A1 | * | 9/2006 | Arhab | 192/3.29 |
| 2007/0048082 A1 | | 3/2007 | Hoffmann et al. | |
| 2007/0224046 A1 | | 9/2007 | Wang et al. | |

FOREIGN PATENT DOCUMENTS
DE    19755168    6/1999

* cited by examiner

*Primary Examiner* — Rodney H Bonck
(74) *Attorney, Agent, or Firm* — Simpson & Simpson, PLLC

(57) ABSTRACT

A piston plate stop for a torque converter including: a flexible connection element with a first end and a second end, the first end arranged to connect to a piston plate for the torque converter, the second end arranged to rotationally connect to a cover for the torque converter and a stop disposed on the flexible connection element. The stop is arranged to restrict axial movement of the piston plate. In some aspects, the flexible connection element is arranged to rotationally connect the cover and the piston plate. A torque converter including a piston plate; a cover; and at least one flexible connection element rotationally connecting the piston plate and the cover. The flexible connection element has a tab that is positioned to limit axial displacement of the piston plate away from the cover.

17 Claims, 14 Drawing Sheets

SOLID STOP LEAF SPRING

CROSS REFERENCE TO RELATED APPLICATIONS

This patent application claims the benefit under 35 U.S.C. §119(e) of U.S. Provisional Application No. 60/842,487, filed Sep. 6, 2006, which application is incorporated herein by reference.

FIELD OF THE INVENTION

The invention relates generally to a torque converter, and, more particularly, to a torque converter with leaf spring assembly that limits axial displacement of the piston plate toward the turbine hub.

BACKGROUND OF THE INVENTION

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At high speed ratios, the torque converter is less efficient. The torque ratio of the torque converter gradually reduces from a high of about 1.8 to 2.2, to a torque ratio of about 1 as the turbine rotational speed approaches the pump rotational speed. Torque ratio of 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Maximum torque converter efficiency is limited to 92-93% based on losses in the fluid. Therefore torque converter clutch 49 is employed to mechanically connect the torque converter input to the output, improving efficiency to near 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

Some torque converters incorporate a leaf spring connection that rotationally connects the piston plate to the cover of the torque converter. Leaf springs can transmit torque from the cover to the piston plate and still enable axial displacement or movement of the piston plate. A torque converter in a release state axially displaces the piston plate toward the turbine.

The release state normally occurs when a vehicle is stopped. Axial displacement of piston plate away from cover is normally unrestricted in the release state and piston plate can contact the turbine hub. If uncontrolled, axial displacement of the piston plate toward the turbine can lead to the piston plate contacting the turbine hub, leading to wear on the piston plate and the turbine hub. In such a state, the cover and piston plate continue to rotate together due to leaf springs rotationally connecting the two components together. In the release state the turbine does not rotate, thus, the rotating piston plate that has displaced axially can rub against the turbine hub leading to wear on both the piston plate and turbine hub. Contact and wear between piston plate and the turbine hub can be detrimental to the function and life of a torque converter.

Thus, there is a long-felt need to provide a torque converter that can limit the axial displacement of the piston plate to prevent wear to the piston plate and the turbine hub.

SUMMARY OF THE INVENTION

The present invention broadly comprises a piston plate stop for a torque converter, including: a flexible connection element with a first end and a second end, the first end arranged to connect to a piston plate for the torque converter, the second end arranged to rotationally connect to a cover for the torque converter; and a stop disposed on the flexible connection element. The stop is arranged to restrict axial movement of the piston plate. In some aspects, the flexible connection element is arranged to rotationally connect the cover and the piston plate, the flexible connection element comprises a leaf spring, or the stop further comprises an appendage on the flexible connection element proximate the second end. In some aspects, the stop is arranged to prevent contact between the piston plate and a turbine hub for the torque converter, or the piston plate includes an axial surface disposed axially opposite the cover and the stop is positioned to contact the axial surface.

In some aspects, the piston plate stop includes a drive plate arranged to be fixedly secured to the cover, the stop comprises a clip secured to the first end, a portion of the clip is arranged to axially overlap the drive plate, and the second end is arranged to be connected to the drive plate. In some aspects, the piston plate stop includes a drive plate arranged to be fixedly secured to the cover, the stop comprises a rivet arranged to secure the first end to the piston plate, a portion of the rivet is arranged to axially overlap the drive plate, and the second end is arranged to be connected to the drive plate.

The present invention also broadly comprises a torque converter, including: a piston plate; a cover; at least one flexible connection element rotationally connected to the piston plate and the cover; and a stop positioned to limit axial displacement of the piston plate away from the cover. In some aspects, the stop comprises a tab on the at least one flexible connection element and the tab has a bend that displaces the tab to contact an axial surface of the piston plate proximate an outer circumference of the piston plate. In some aspects, the axial surface of the piston plate is opposite the cover, the contact occurs when the torque converter is in a release state, or the tab has a bend that positions a distal portion of the tab in axial alignment with an axial surface of the piston plate. In some aspects, the distal portion of the tab prevents axial displacement of the piston plate past the tab.

In some aspects, the torque converter comprises a turbine hub and the stop limits axial displacement of the piston plate to prevent contact with the turbine hub, or the flexible connection element comprises a leaf spring. In some aspects, the torque converter includes a drive plate fixedly secured to the cover, the stop comprises a clip secured to a first end of the flexible connection element and to the piston plate, a portion of the clip axially overlaps the drive plate, and a second end of the flexible connection element is connected to the drive plate. In some aspects, the torque converter includes a drive plate fixedly secured to the cover, the stop comprises a rivet securing a first end of the flexible connection element to the piston plate, a portion of the rivet axially overlaps the drive plate, and a second end of the flexible connection element is connected to the drive plate.

The present invention further broadly comprises a torque converter, including: a piston plate; a cover; and a plurality of flexible connection elements rotationally connecting the piston plate and the cover. At least one flexible connection element in the plurality of flexible connection elements has a bent section arranged to contact the piston plate to prevent axial displacement of the piston plate beyond the bent section. In some aspects, the bent section contacts the piston plate proximate an outer circumference of the piston plate. In some aspects, the contact occurs on an axial surface of the piston plate. In some aspects, the flexible connection element comprises a leaf spring.

It is a general object of the present invention to provide a rotationally connected torque converter and piston plate while preventing the piston plate from contacting a turbine hub.

It is another object of the present invention to provide a torque converter with a piston plate stop that prevents contact between a piston plate and a turbine hub.

It is a further object of the present invention to provide a torque converter with a leaf spring assembly having a piston plate stop that can limit axial displacement of a piston plate.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE PREFERRED EMBODIMENT

Figure 1:
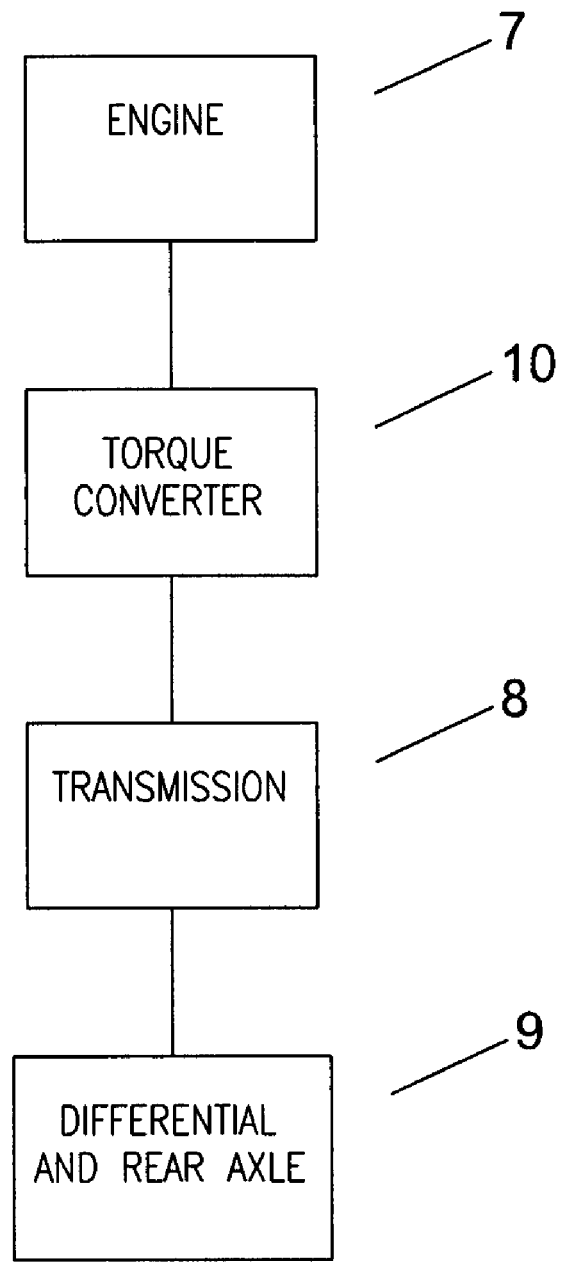
FIG. 1 is a general block diagram illustration of power flow in a motor vehicle, intended to help explain the relationship and function of a torque converter in the drive train thereof.
Figure 2:
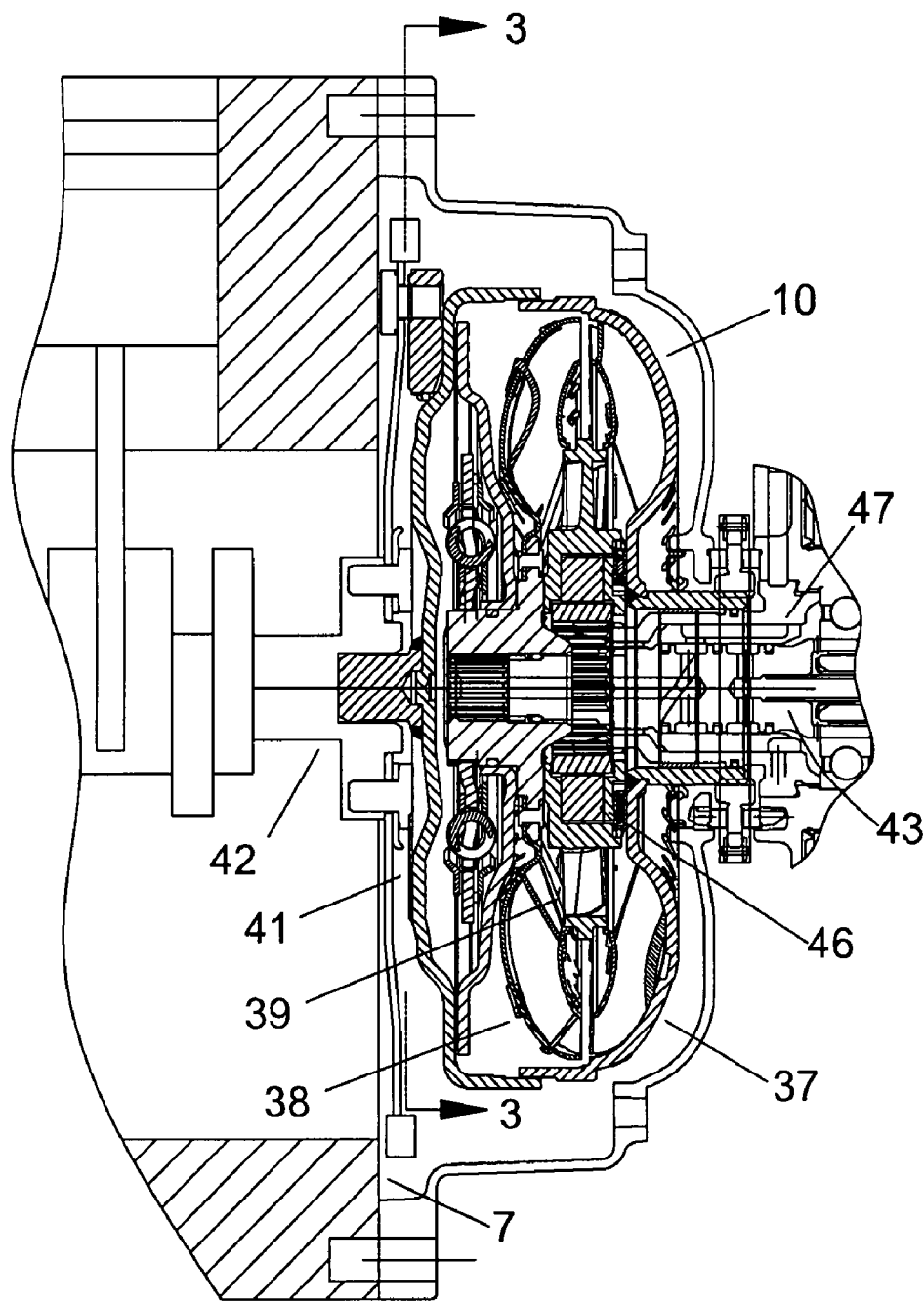
FIG. 2 is a cross-sectional view of a prior art torque converter, shown secured to an engine of a motor vehicle.
Figure 3:
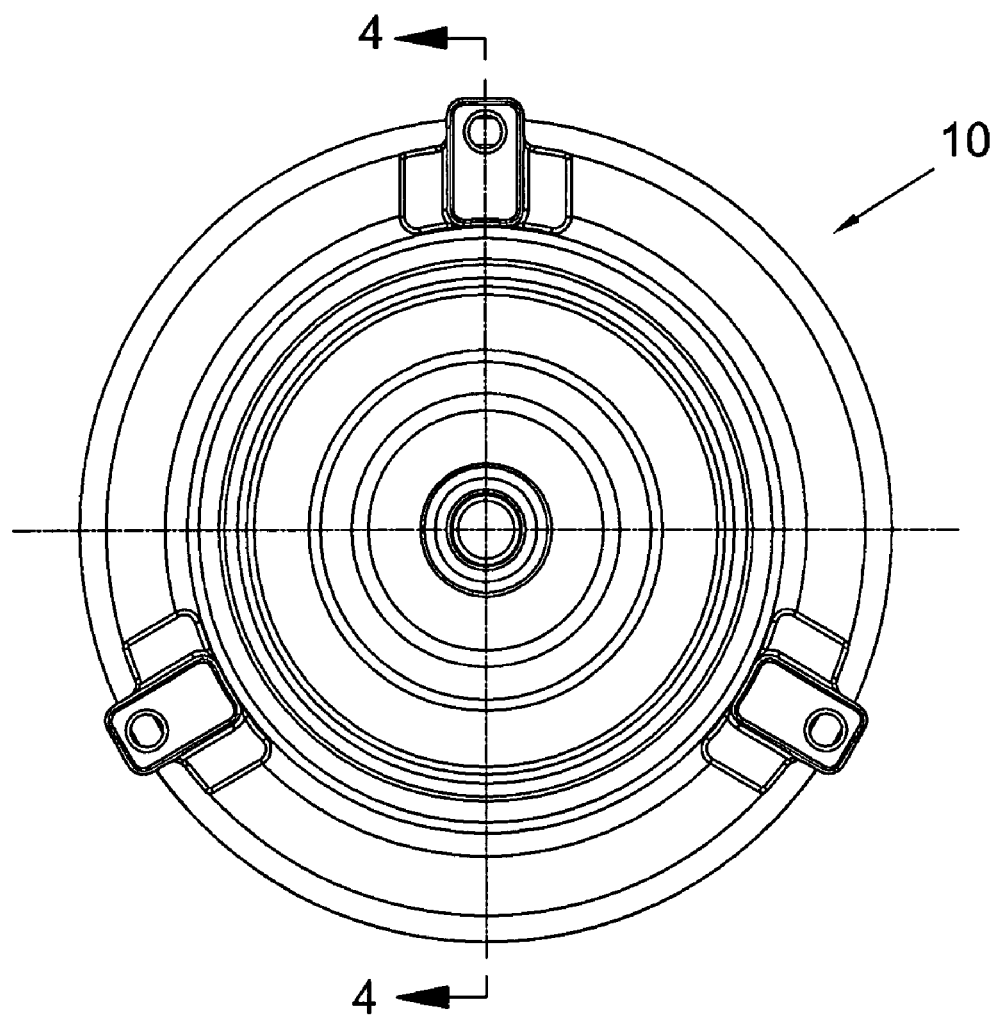
FIG. 3 is a left view of the torque converter shown in FIG. 2, taken generally along line 3-3 in FIG. 2.
Figure 4:
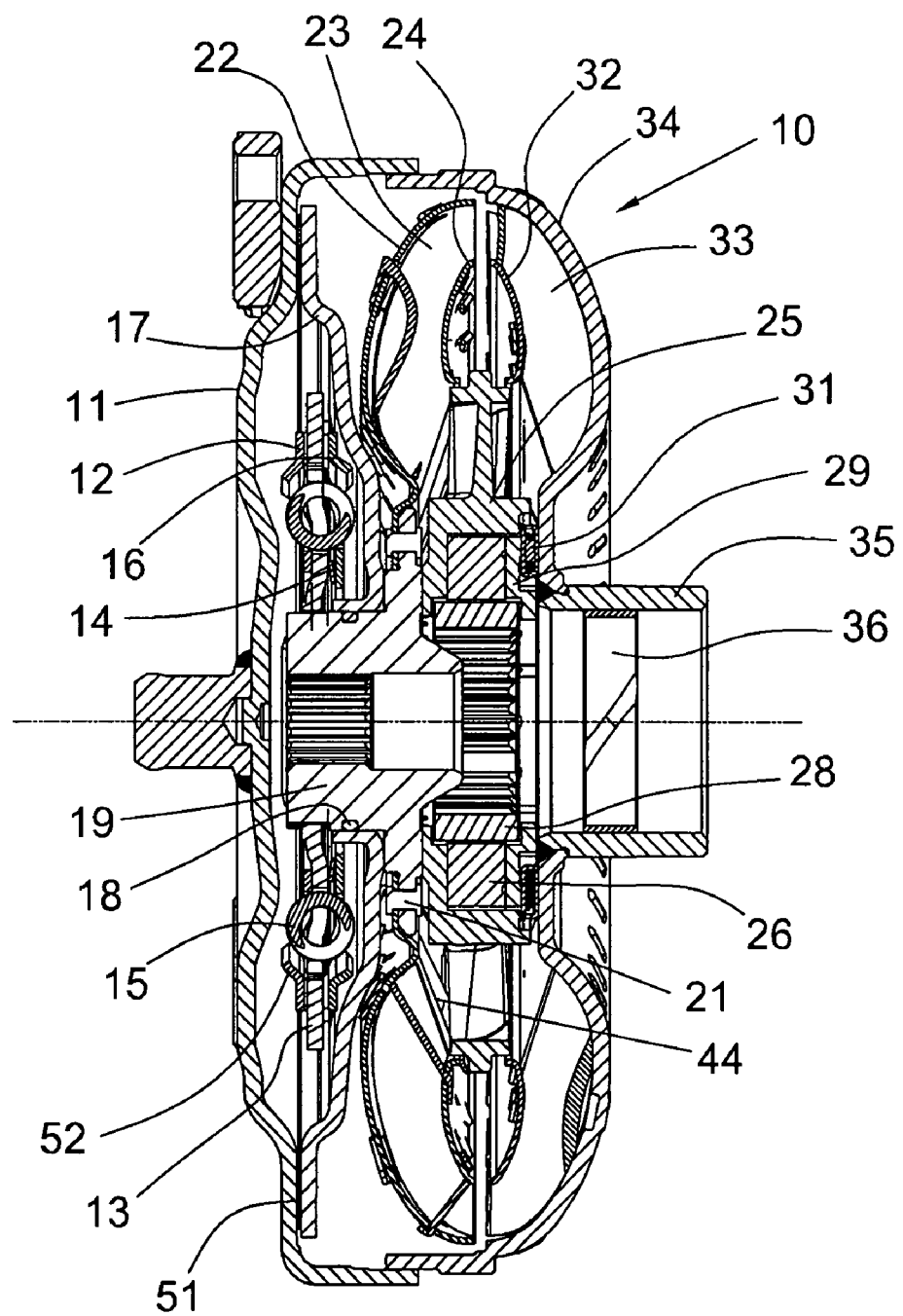
FIG. 4 is a cross-sectional view of the torque converter shown in FIGS. 2 and 3, taken generally along line 4-4 in FIG. 3.
Figure 5:
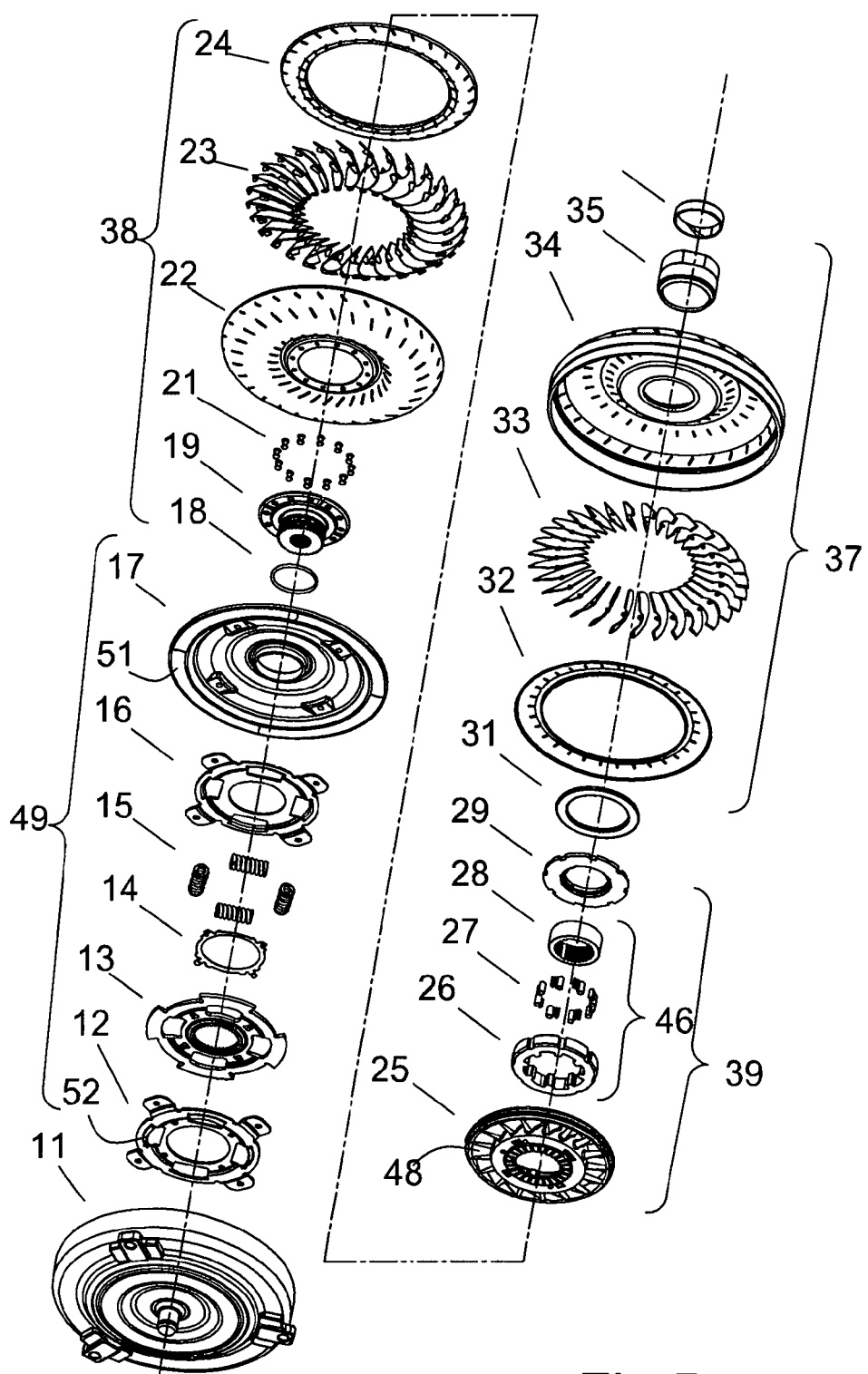
FIG. 5 is a first exploded view of the torque converter shown in FIG. 2, as shown from the perspective of one viewing the exploded torque converter from the left.
Figure 6:
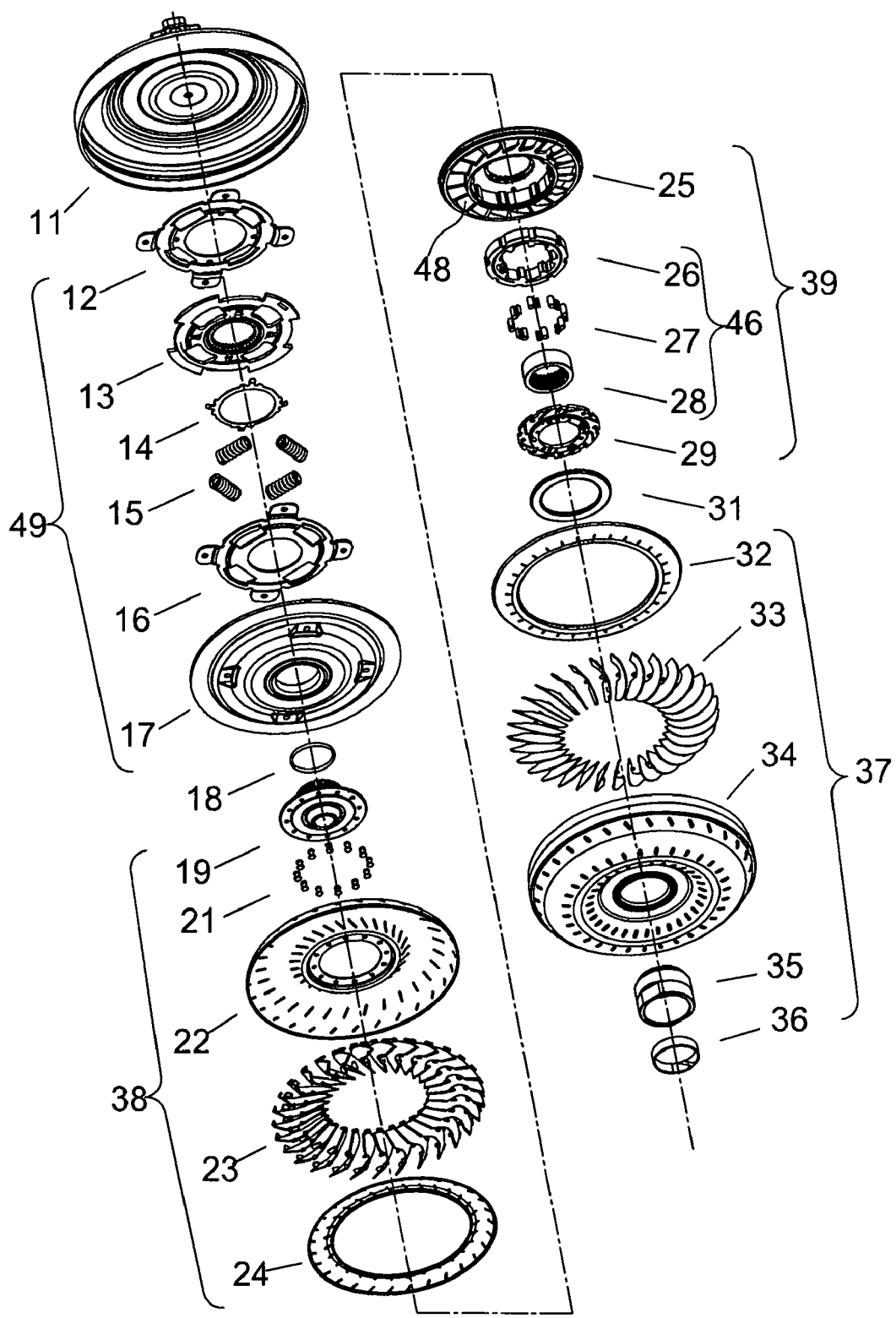
FIG. 6 is a second exploded view of the torque converter shown in FIG. 2, as shown from the perspective of one viewing the exploded torque converter from the right.

At the outset, it should be appreciated that like drawing numbers on different drawing views identify identical structural elements of the invention. While the present invention is described with respect to what is presently considered to be the preferred embodiments, it is understood that the invention is not limited to the disclosed embodiments. In the description below, the terms "top", "bottom", "upper", "lower", "front", "back", "rear", "left", "right", and their derivatives, should be interpreted from the perspective of one viewing the invention shown in FIG. 1.

Furthermore, it is understood that this invention is not limited to the particular methodology, materials and modifications described and as such may, of course, vary. It is also understood that the terminology used herein is for the purpose of describing particular embodiments only, and is not intended to limit the scope of the present invention.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 7A:
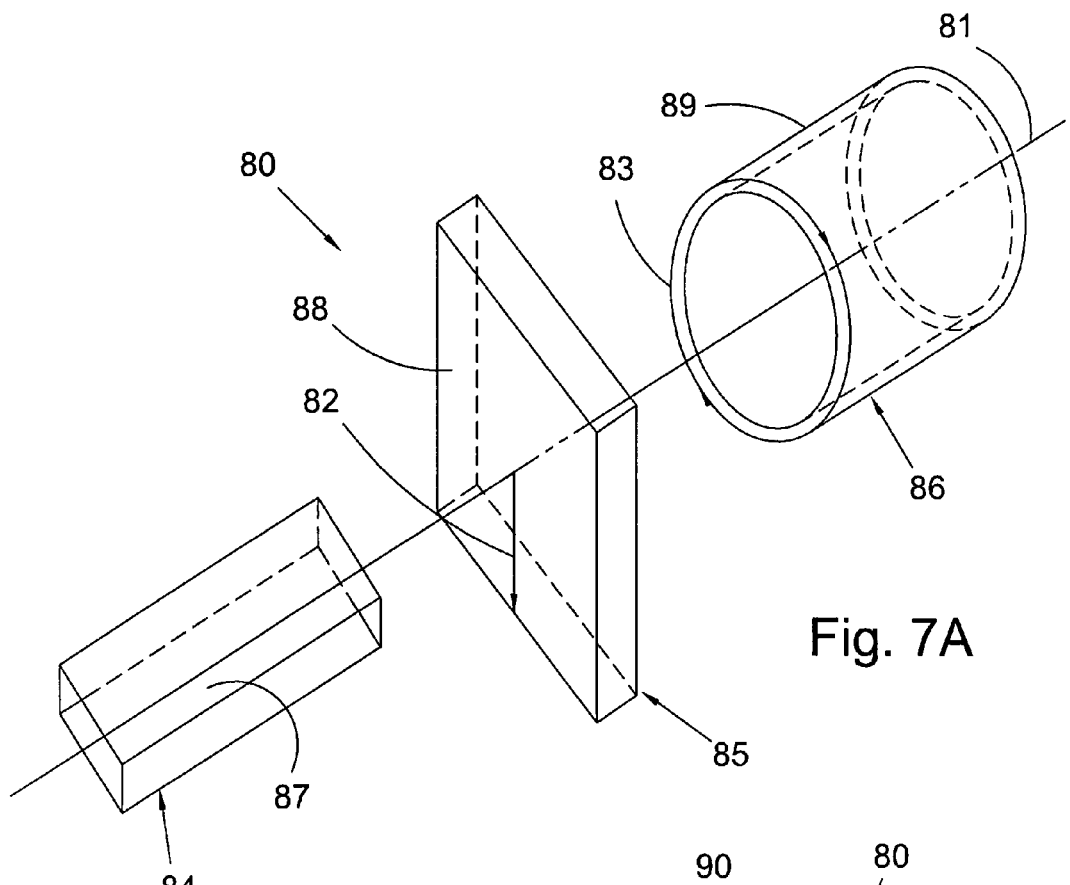
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 7B:
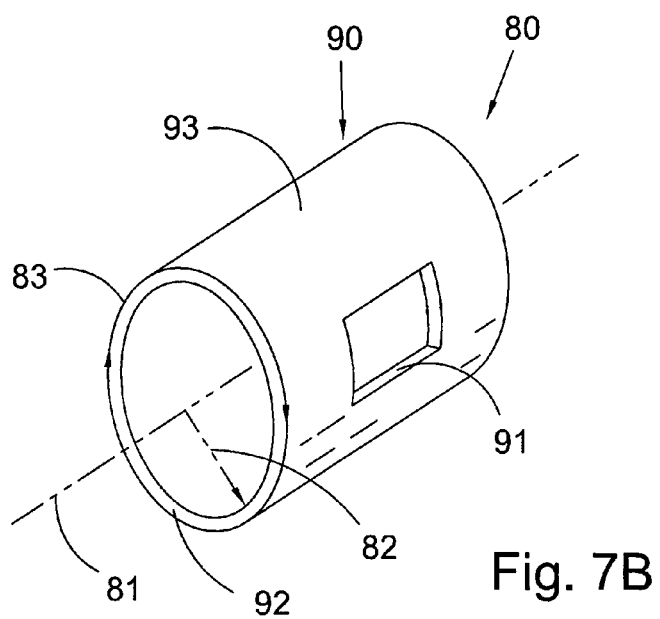
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
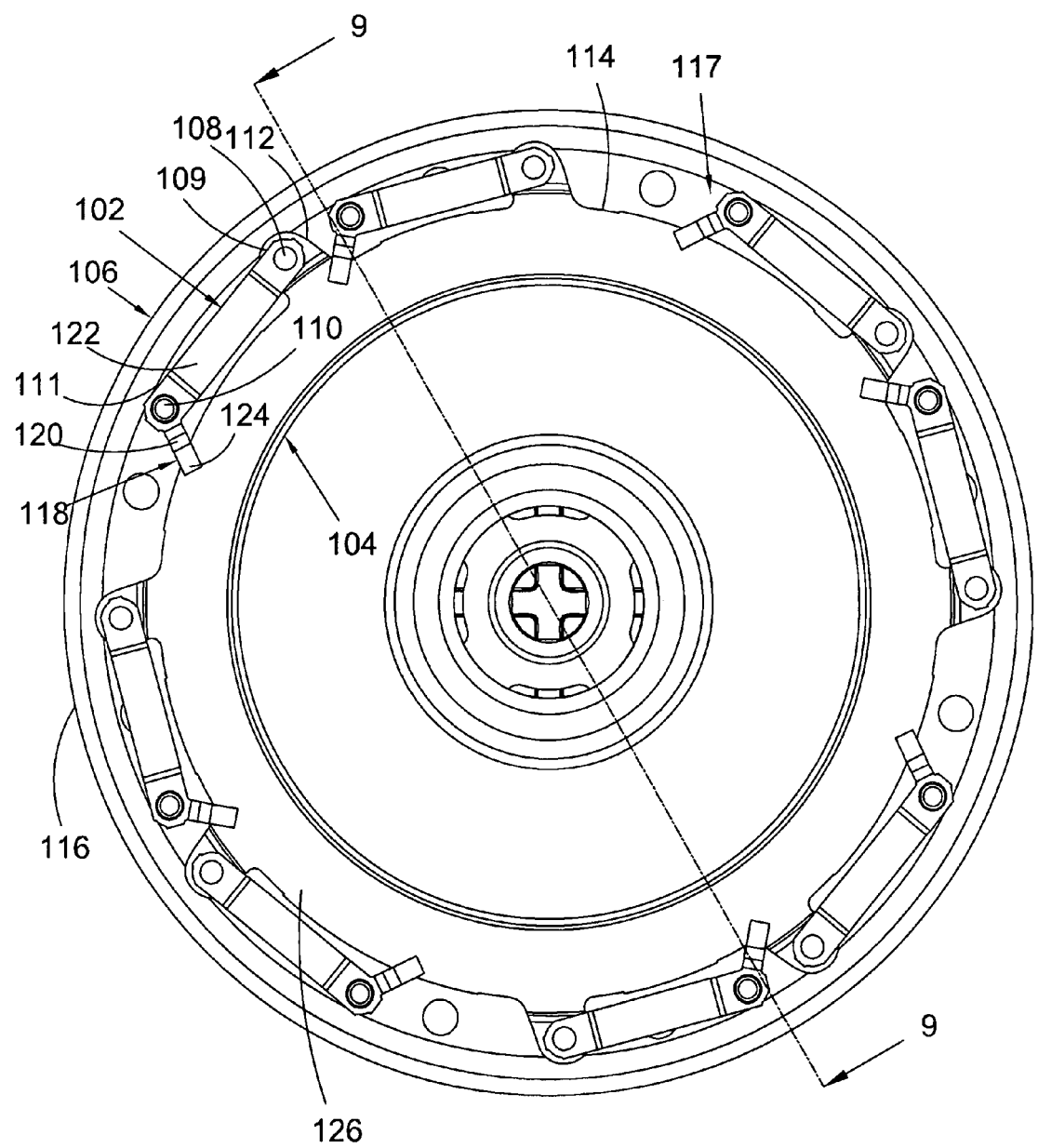
FIG. 8 is a front view of a piston plate and cover rotationally connected with a leaf spring assembly of the present invention.

FIG. 8 is a front view of a piston plate and cover rotationally connected with a leaf spring assembly of the present invention.

Figure 9:
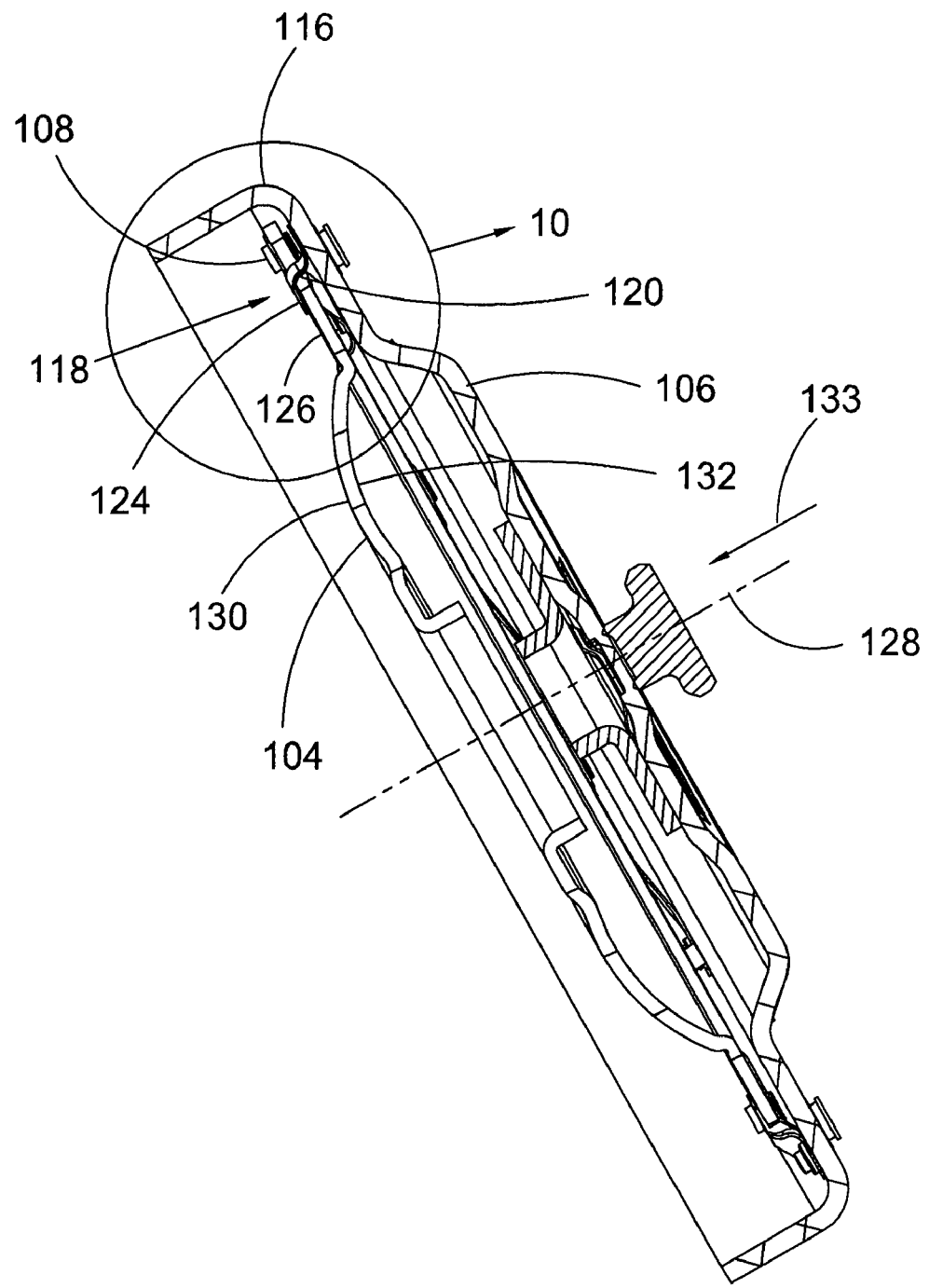
FIG. 9 is a cross-sectional view of the piston plate, cover and leaf spring assembly shown in FIG. 8, taken generally along line 9-9 in FIG. 8.

FIG. 9 is a cross-sectional view of the piston plate, cover and leaf spring assembly shown in FIG. 8, taken generally along line 9-9 in FIG. 8. The following should be viewed in light of FIGS. 8 and 9. Flexible connection elements 102 are shown rotationally connected to piston plate 104 and cover 106. In some aspects, the elements are directly fastened to the plate and the cover. In some aspects, elements 102 are leaf springs. However, it should be understood that any means known in the art for flexibly connecting rotating components can be used for elements 102. Hereinafter, the flexible connection elements are referred to as leaf springs. By rotationally connecting, or securing, we mean that the plate and the cover are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline or flexible connection. However, it should be understood that rotational connection does not imply that movement in other directions is necessarily present. For example, two components that are rotationally connected can be axially fixed one to the other. The preceding explanation of rotational connection is applicable to the discussions infra. Leaf springs 102 are shown fixedly attached to piston plate 104 by rivets 108, and fixedly attached to cover 106 by rivets 110. The number and spatial arrangement of leaf springs 102 depicted in FIG. 8 should be understood to be only one possible arrangement that is contemplated, and other numbers and spatial arrangements of leaf springs 102 are within the scope and spirit of the invention.

Each end of leaf spring 102 is connected to piston plate 104 or cover 106, respectively. In some aspects, end 109 is connected to piston plate 104 and end 111 is connected to cover 106. Alternatively, leaf spring 102 can be attached by any means known in the art, for example, including but not limited to, welding or bolts.

In some aspects, rivets 108 are preened or upset, and inserted through holes in tabs 112 on piston plate 104. In some aspects, rivets 108 are stand alone rivets. In some aspects, rivets 108 are extruded from piston plate 104. However, another attachment technique known in the art can also be used. Tabs 112 are shown evenly spaced about outer circumference 114 of piston plate 104. However, it should be understood that other spatial configurations are possible. In some aspects (not shown), piston plate 104 has a uniform circumference (the circumference does not have radial extensions) to which leaf springs 102 are attached. For example, rivet holes can be placed on a uniform circumference.

Rivets 110 are shown preened and upset, and inserted through holes proximate outer circumference 116 of cover 106. In some aspects, rivets 110 are stand alone rivets. In some aspects, rivets 110 are extruded from cover 106. However, any attachment technique known in the art can also be used.

As further described infra, stop 117 is arranged to restrict axial movement of piston plate 104. Leaf spring 102 has intermediate portion 122, and appendage, or tab, 118 configured with bend 120 and stop 124 at the distal portion of the tab. In some aspects, stop 117 includes appendage or tab 118, positioned and shaped to prevent axial displacement of piston plate 104 past tab 118. In other words, tab 118 is a segment on leaf spring 102 designed as a stop to limit axial displacement of piston plate 104. Therefore, appendage 118 functions as a stop or limit on the degree of axial displacement of piston plate 104 away from cover 106. Appendage 118 can be attached to leaf spring 102 or leaf spring 102 and appendage 118 can be formed as one integral unit, for example, using steel that is stamped into the desired form. Attachment of appendage 118 to leaf spring 102 can be accomplished with welding or any attachment method known in the art.

In some aspects, intermediate portion 122 and stop 124 are operatively arranged to contact axial surface 126 of piston plate 104 proximate outer circumference 114. Stop 124 is shown as the distal portion of appendage 118, but it should be understood that any portion of leaf spring 102 can be engineered to contact piston plate 104 and stop axial displacement of the plate. For instance, leaf spring 102 could have a bend (not shown) positioned at a different location than tab 118 to contact piston plate 104 and stop axial displacement of the plate.

Referring to FIG. 9, leaf springs 102 enable piston plate 104 to move axially along axis 128 toward or away from cover 106 within the constraints noted supra. Typically, axial displacement of piston plate 104 toward cover 106 occurs when the torque converter is in the apply state, as pressure develops on apply side 130 of piston plate 104. Axial displacement of piston plate 104 away from cover 106 typically occurs during the release state of the torque converter, as pressure develops on release side 132 of piston plate 104, and pressure on apply side 130 diminishes.

Appendage 118 is operatively arranged to contact axial surface 126 proximate outer circumference 114 of piston plate 104. In the release state, as piston plate 104 moves in direction 133 axially away from cover 106, axial surface 126 contacts appendage 118 and stops or limits axial displacement of piston plate 104 in direction 133. In some aspects, stop 124 at the distal portion of appendage 118, contacts axial surface 126, preventing further axial displacement of piston plate 104. Thus, piston plate 104 is prevented from contacting the turbine hub, which prevents wear to the turbine hub and piston plate 104. Implementation of multiple leaf springs 102, with appendages 118 results in multiple points of contact on axial surface 126. In some aspects, multiple stops 124 contact axial surface 126 of piston plate 104 at several locations proximate outer circumference 114.

Figure 10:
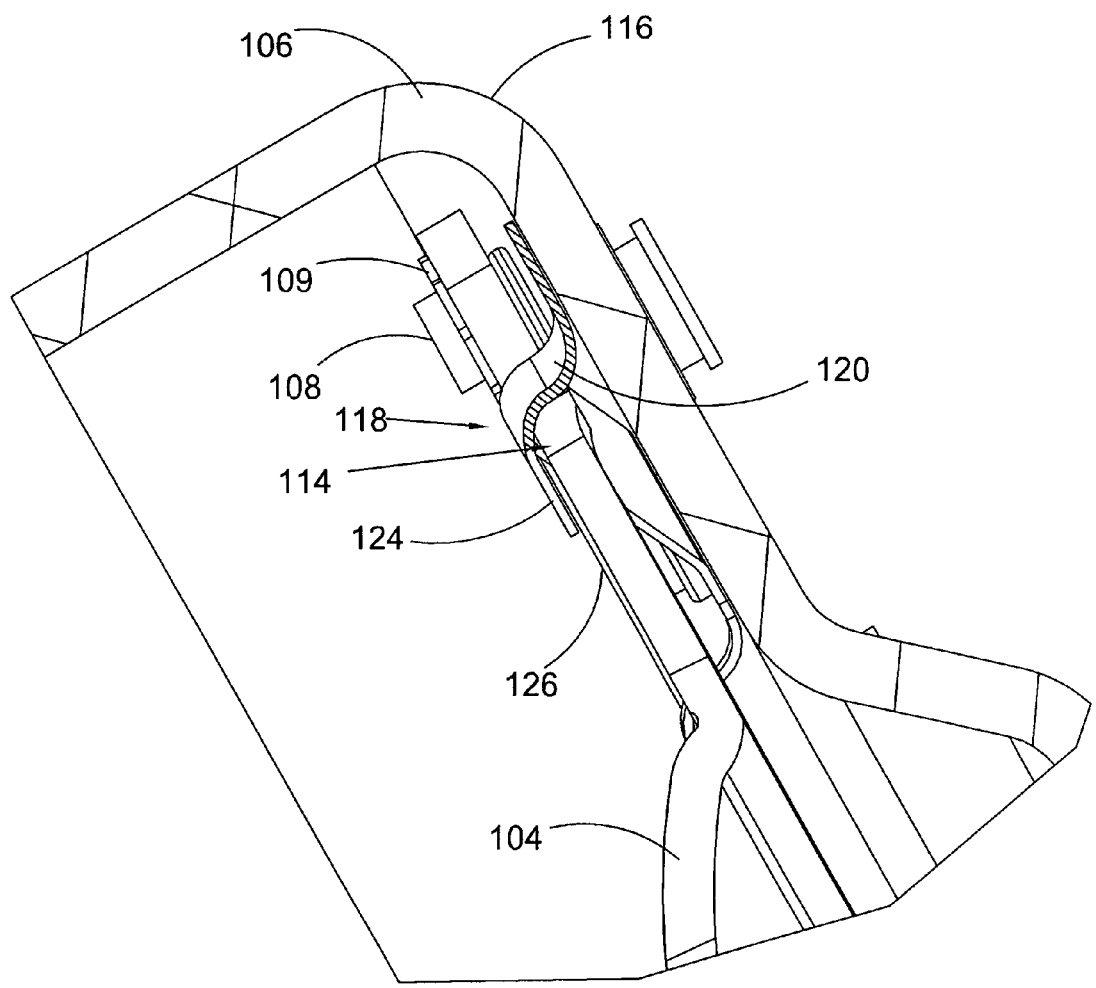
FIG. 10 is a partial cross-sectional view of the piston plate, cover and leaf spring assembly shown in FIG. 8, taken generally at circle 10 shown in FIG. 9.

FIG. 10 is a partial cross-sectional view of piston plate 104, cover 106 and leaf spring 102 shown in FIG. 8, taken generally near circle 10 shown in FIG. 9. This partial cross-sectional view demonstrates the positioning and shape of appendage 118. Bend 120 is depicted as a smooth s-shaped curve. It should be understood that other configurations of bend 120 are considered within the spirit and scope of the invention, including, but not limited to, an angular bend formed with right angles. In some aspects (not shown), bend 120 is eliminated and appendage 118 has stop 124 at another portion of leaf spring 102.

Figure 11:
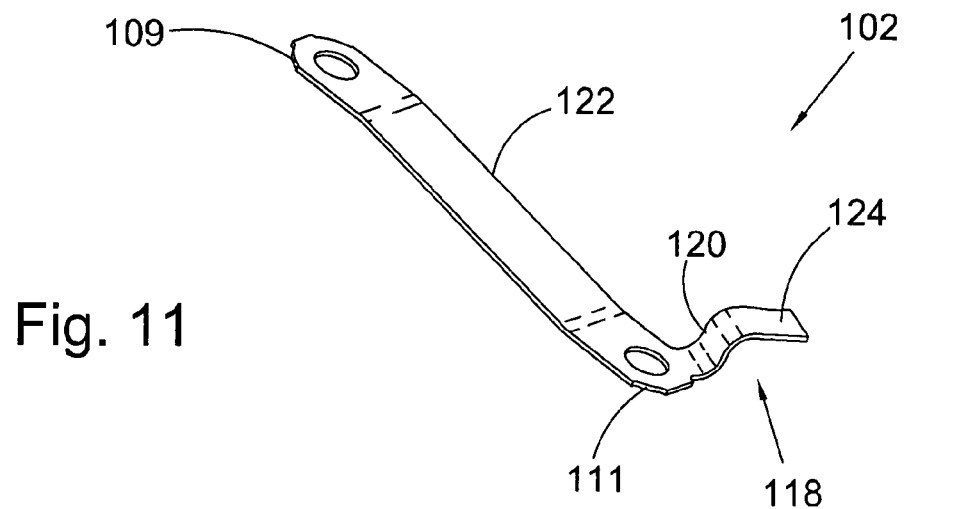
FIG. 11 is perspective view of a leaf spring.

FIG. 11 is a perspective view of leaf spring 102. Appendage 118 is shown positioned on leaf spring 102 at roughly a forty-five degree angle. In some aspects (not shown), appendage 118 can be positioned at other angles relative to intermediate portion 122 in order to facilitate contact with axial surface 126 of piston plate 104. Appendage 118 is integral to leaf spring 102 proximate end 111, but as discussed supra some variation on appendage 118 can be used and positioned at various points on leaf spring 102.

Figure 12:
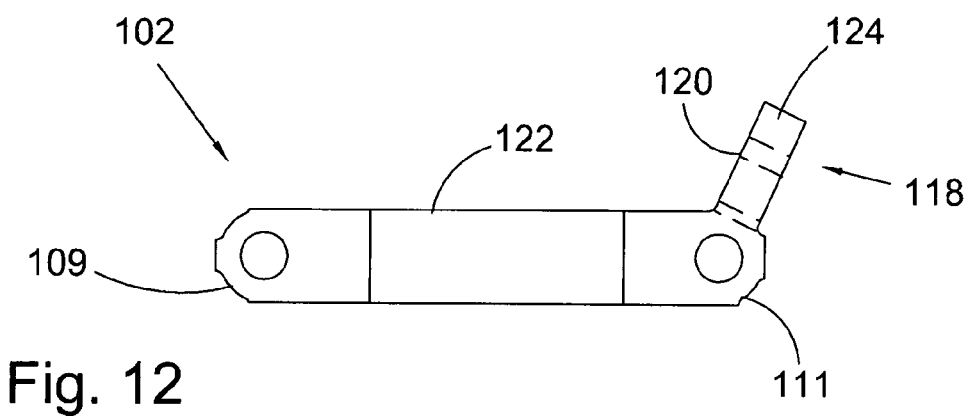
FIG. 12 is a top plan view of the leaf spring.
Figure 13:
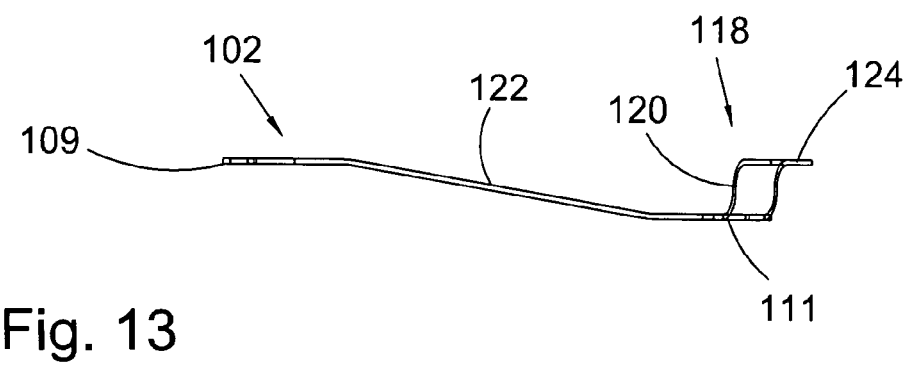
FIG. 13 is an elevational view of the leaf spring.

FIGS. 12 and 13 are a top plan view of leaf spring 102, and an elevational view of leaf spring 102, respectively. In some aspects, leaf spring 102 has an intermediate portion 122 that has respective bends proximate end 109 and 111 that enable piston plate 104 to displace axially, and attach to piston plate 104 and cover 106 simultaneously. In some aspects, rigid attachment of end 111 to cover 106 provides the rigidity needed to prevent appendage 118 from shifting as appendage 118 stops axial displacement of piston plate 104 upon contact with axial surface 126. The configuration of appendage 118 that is shown is only one possible shape of the leaf spring 102 and it should be understood that various other configurations can be used to limit the axial displacement of piston plate 104.

Figure 14:
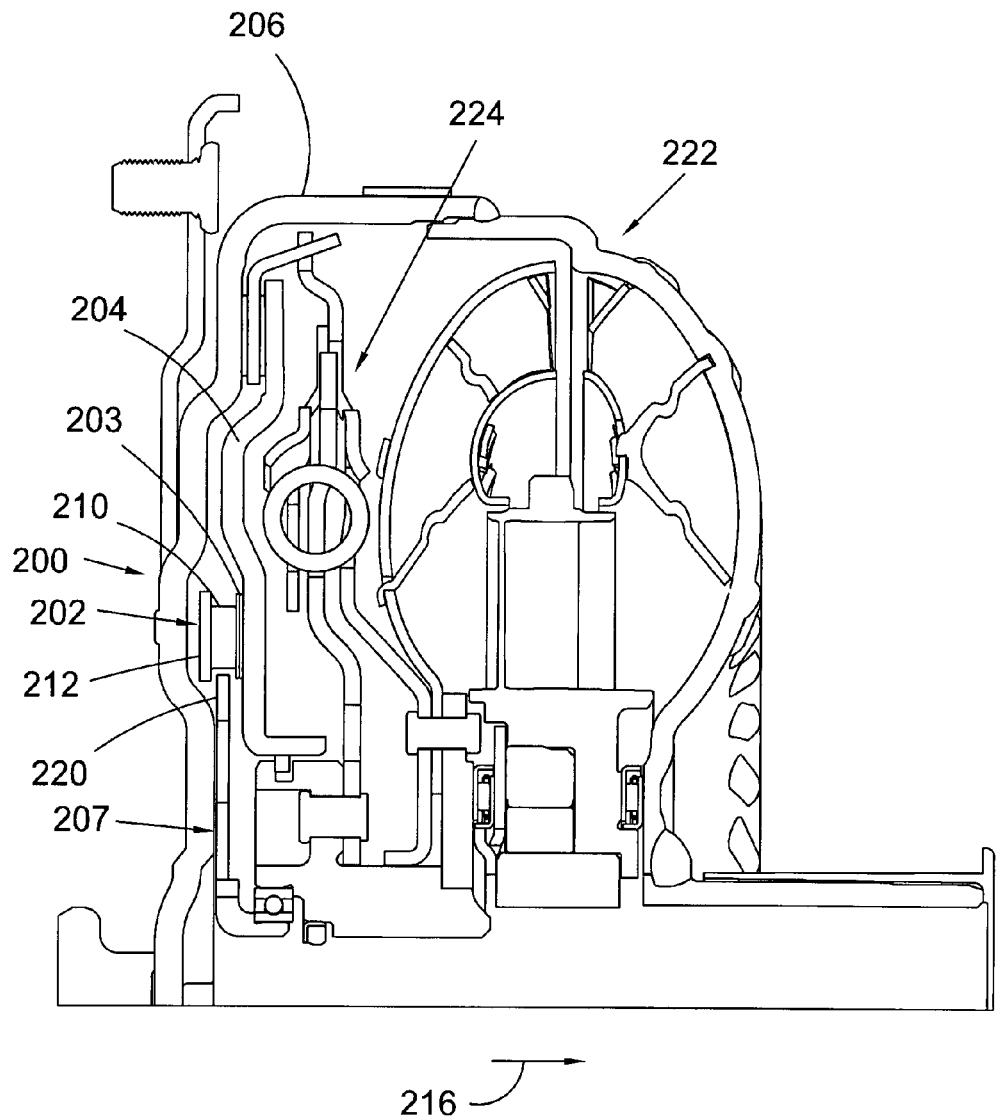
FIG. 14 is a partial cross sectional view of a torque converter with a present invention piston plate stop.

FIG. 14 is a partial cross sectional view of a torque converter with present invention piston plate stop 200.

Figure 15:
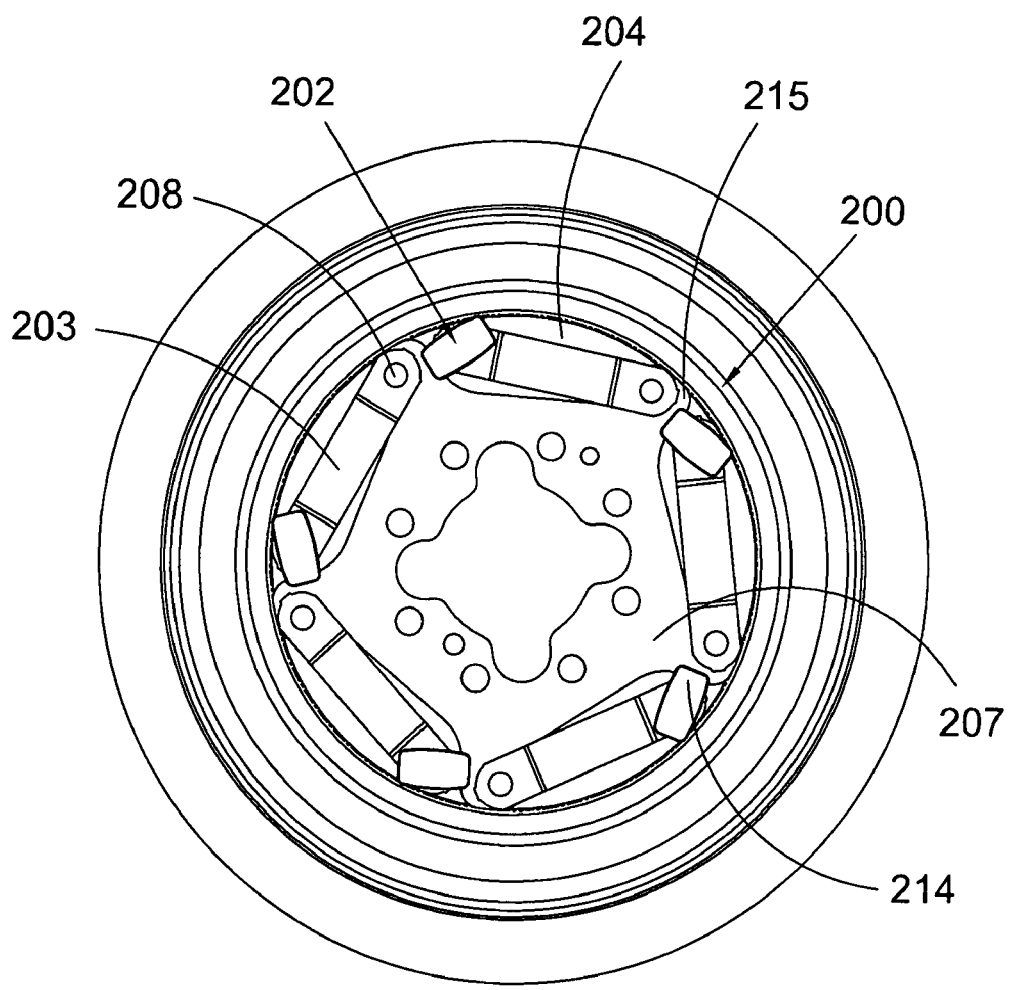
FIG. 15 is a front view of a present invention piston plate stop with a rivet.

FIG. 15 is a front view of a present invention piston plate stop 200 with rivet 202.

Figure 16:
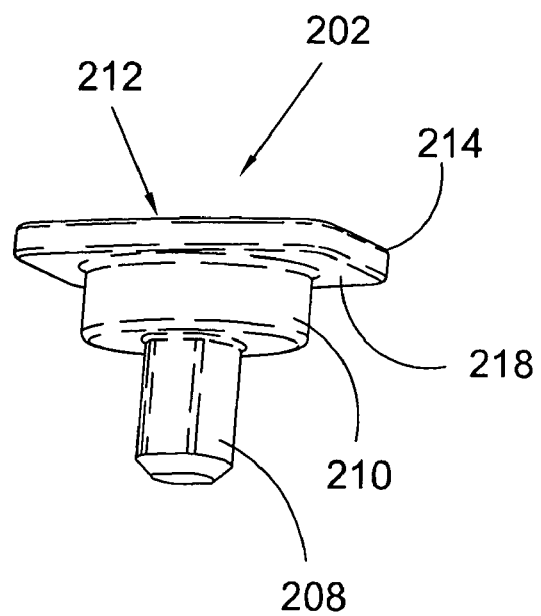
FIG. 16 is a perspective view of the rivet shown in FIG. 15.

FIG. 16 is a perspective view of rivet 202 shown in FIG. 15. The following should be viewed in light of FIGS. 14-16. Flexible connection elements 203 are shown rotationally connected to piston plate 204 and cover 206. In some aspects, the elements are directly fastened to the plate and indirectly connected to the cover. For example, flexible connection elements 203 are shown rotationally connecting piston plate 204 to cover 206 via drive plate 207, which is fixedly secured to cover 206 by any means known in the art. In some aspects, elements 203 are leaf springs. However, it should be understood that any means known in the art for flexibly connecting rotating components can be used for elements 203. Hereinafter, the flexible connection elements are referred to as leaf springs. Leaf springs 203 are shown fixedly attached to piston plate 204 by rivets 202, and fixedly attached to drive plate 207 by rivets 208. Alternatively, leaf spring 203 can be attached to plate 207 by any means known in the art, for example, including but not limited to, welding or bolts. The number and spatial arrangement of leaf springs 203 depicted in FIG. 15 should be understood to be only one possible arrangement that is contemplated, and other numbers and spatial arrangements of leaf springs 203 are within the spirit and scope of the invention.

As further described infra, stop 200 is arranged to restrict axial movement of piston plate 204. In some aspects, stop 200 includes rivet 202. Rivet 202 includes portions 208 and 210 and head 212. Portion 208 passes through element 203 and is inserted in piston plate 204 to secure element 203 to plate 204. Plate 207 is radially aligned with portion 210. Portion 214 of head 212 axially overlaps plate 207, for example, circumferential protrusions 215. It should be understood that other axially overlapping configurations of head 212 and plate 207 are included in the spirit and scope of the claimed invention. Rivet 202 is axially connected to plate 204, that is, the rivet and the plate move together axially. However, plate 207 is axially independent of the rivet. For example, plate 207 is not axially connected to the rivet and the axial movement of plate 204 and the rivet does not cause an axial movement of plate 207. Therefore, when plate 204 has translated a sufficient distance in axial direction 216, rivet 202 contacts plate 207, for example, surface 218 of portion 214 contacts surface 220 of plate 207. Since plate 207 is fixed to cover 206, plate 207 prevents rivet 202, and hence, plate 204 from translating further in direction 216 once rivet 202 and plate 207 are in contact. Thus, stop 200 prevents undesirable contact between plate 204 and other components of torque converter 222, for example, damper 224.

Figure 17:
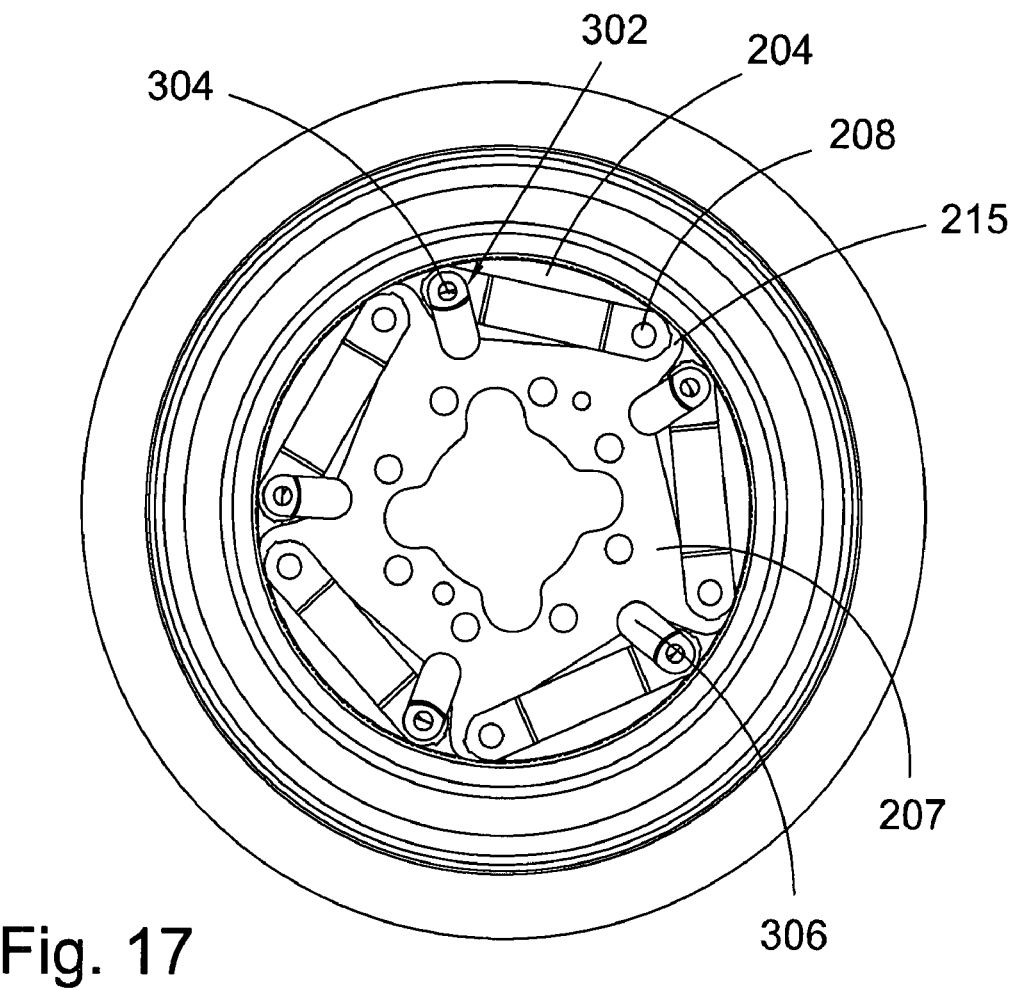
FIG. 17 is a front view of a present invention piston plate stop with a clip; and, FIG. 18 is a perspective view of the clip shown in FIG. 17.

FIG. 17 is a front view of present invention piston plate stop 200 using clip 302.

Figure 18:
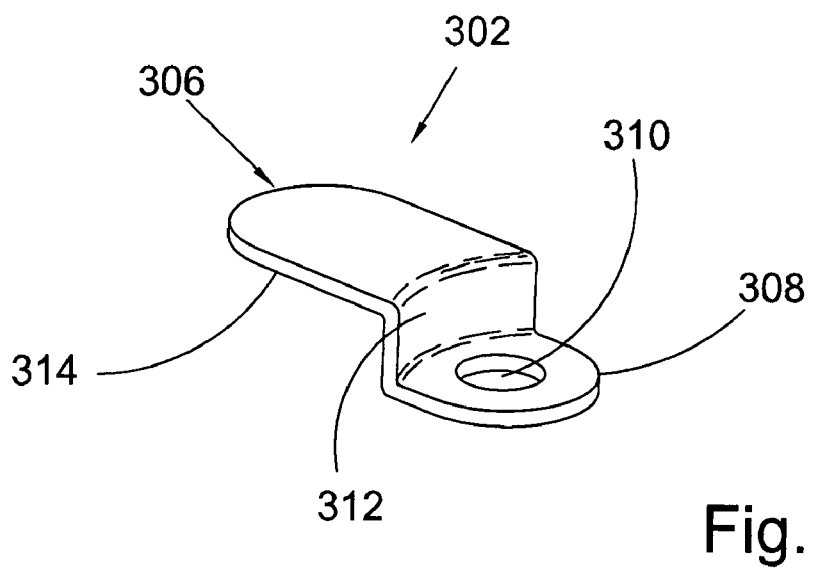

FIG. 18 is a perspective view of clip 302 shown in FIG. 17. The following should be viewed in light of FIGS. 14-18. Flexible connection elements 203 are shown rotationally connecting piston plate 204 to cover 206 via drive plate 207, which is fixedly secured to cover 206 by any means known in the art. Leaf springs 203 are shown fixedly attached to piston plate 204 by fasteners 304, and fixedly attached to drive plate 207 by rivets 208. Alternatively, leaf spring 203 can be attached by any means known in the art, for example, including but not limited to, welding or bolts. The number and spatial arrangement of leaf springs 203 depicted in FIG. 17 should be understood to be only one possible arrangement that is contemplated, and other numbers and spatial arrangements of leaf springs 203 are within the spirit and scope of the invention.

As noted supra, stop 200 is arranged to restrict axial movement of piston plate 204. In some aspects, and as shown in FIG. 17, stop 200 includes clip 302. Clip 302 includes lip 306 and portion 308. Portion 308 is engaged with element 203, for example, lies against element 203, and fastener 304 passes through hole 310 in portion 308 to secure element 203 to the piston plate. Plate 207 is radially aligned with portion 312 of the clip. Lip 306 axially overlaps plate 207, for example, circumferential protrusions 215, in a manner similar to that described supra for rivet 202. It should be understood that other axially overlapping configurations of lip 306 and plate 207 are included in the spirit and scope of the claimed invention. Clip 302 is axially connected to plate 204, that is, the clip and the plate move together axially. However, plate 207 is axially independent of the clip. For example, plate 207 is not axially connected to the clip and the axial movement of plate 204 and the clip does not cause an axial movement of plate 207. Therefore, with respect to the frame of reference in FIG. 14, when plate 204 has translated a sufficient distance in axial direction 216, clip 302 contacts plate 207, for example, surface 314 of lip 306 contacts surface 220 of plate 207. Since plate 207 is fixed to cover 206, plate 207 prevents clip 302, and hence, plate 204 from translating further in direction 216 once clip 302 and plate 207 are in contact.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. A piston plate stop for a torque converter, comprising:
a first end for a flexible connection element, said first end arranged to directly connect to a piston plate for said torque converter;
a second end for the flexible connection element, said second end arranged to directly connect to a cover for said torque converter; and,
a stop for the flexible connection element extending from the second end, wherein:
the stop is for contacting a portion of the piston plate facing away from the cover to restrict axial movement of said piston plate; and,
the first end, the second end, and the stop are formed from a single piece of material.

2. The piston plate stop of claim 1, wherein said flexible connection element comprises a leaf spring.

3. The piston plate stop of claim 1, wherein said stop further comprises an appendage on said flexible connection element proximate said second end.

4. The piston plate stop of claim 1, wherein said stop is arranged to prevent contact between said piston plate and a turbine hub for said torque converter.

5. The piston plate stop of claim 1, wherein said piston plate further comprises an axial surface disposed axially opposite said cover and said stop is positioned to contact said axial surface.

6. A torque converter, comprising:
a piston plate;
a cover; and,
at least one flexible connection element, wherein:
a first end of the at least one flexible connection device is directly connected to said piston plate;
a second end of the at least one flexible connection device is directly connected to said cover;
the second end includes a stop extending from the second stop in an axial direction defined as being from the cover toward the piston plate;
the stop includes a tab disposed beyond the piston plate in the axial direction;
the piston plate is axially displaceable away from the portion of the stop; and,
for displacement of the piston plate away from the cover, the tab engages the piston plate to limit axial displacement of said piston plate away from said cover.

7. The torque converter of claim 6, wherein said tab has a bend that displaces said tab to contact an axial surface of said piston plate proximate an outer circumference of said piston plate.

8. The torque converter of claim 7, wherein said axial surface of said piston plate is opposite said cover.

9. The torque converter of claim 7, wherein said contact occurs when said torque converter is in a release state.

10. The torque converter of claim 7, wherein said tab has a bend that positions a distal portion of said tab in axial alignment with an axial surface of said piston plate.

11. The torque converter of claim 10, wherein said distal portion of said tab prevents axial displacement of said piston plate past said tab.

12. The torque converter of claim 6, wherein said torque converter comprises a turbine hub and wherein said stop limits axial displacement of said piston plate to prevent contact with said turbine hub.

13. The torque converter of claim 6, wherein said flexible connection element comprises a leaf spring.

14. A torque converter, comprising:
- a piston plate;
- a cover; and,
- a plurality of flexible connection elements with respective first and second ends directly connected to said piston plate and to said cover, respectively, wherein:
  - the second end is radially outward of a portion of an outer circumference of the piston plate radially aligned with the second end;
  - each flexible connection element includes a radially inwardly facing side and a radially outwardly facing side;
  - the second end includes a stop extending from the second stop in an axial direction defined as being from the cover toward the piston plate;
  - the stop includes a bent section at least partially disposed beyond the piston plate in the axial direction;
  - from a point continuous with the second end to a distal end of the bent section, the bent section extends away from the first end in a circumferential direction;
  - the bent section extends radially inward beyond the radially inwardly facing side;
  - the piston plate is axially displaceable away from the bent section of the stop; and,
  - for displacement of the piston away from the cover, the bent section contacts said piston plate to prevent axial displacement of said piston plate beyond said bent section.

15. The torque converter of claim 14, wherein said bent section contacts said piston plate proximate an outer circumference of said piston plate.

16. The torque converter of claim 14, wherein said contact occurs on an axial surface of said piston plate.

17. The torque converter of claim 14, wherein said flexible connection element comprises a leaf spring.

\* \* \* \* \*